(12) United States Patent
Chan et al.

(10) Patent No.: US 6,836,889 B1
(45) Date of Patent: Dec. 28, 2004

(54) CODE WRAPPING TO SIMPLIFY ACCESS TO AND USE OF ENTERPRISE JAVA BEANS

(75) Inventors: Victor S. Chan, Thornhill (CA); Leonard W. Theivendra, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 09/620,354

(22) Filed: Jul. 20, 2000

(30) Foreign Application Priority Data

Aug. 20, 1999 (CA) .............................................. 2280588

(51) Int. Cl.[7] .......................................... G06F 15/163
(52) U.S. Cl. ...................................................... 719/310
(58) Field of Search ........................................ 709/218

(56) References Cited

U.S. PATENT DOCUMENTS

| | | | | |
|---|---|---|---|---|
| 6,061,714 A | * | 5/2000 | Housel et al. | 709/203 |
| 6,115,793 A | * | 9/2000 | Gruber et al. | 711/133 |
| 6,557,100 B1 | * | 4/2003 | Knutson | 713/100 |

OTHER PUBLICATIONS

Rob Stevenson, Developing EJB Access Beans in VisualAge for Java, Oct. 2000.*

Notes: Item U, was the NPL cited by applicant in his amendment filed on Jun. 22, 2004. It already been scanned in EDan.*

Microsoft Com(MC), Comparing Microsoft Transaction Server to Enterprise JavaBeans, Jul. 30, 1998.*

Ismael, Osman Abdoul, Remote Object Access, Dec. 5, 1999.*

* cited by examiner

Primary Examiner—Thomas Lee
Assistant Examiner—LeChi Truong
(74) Attorney, Agent, or Firm—David A. Mims, Jr.

(57) ABSTRACT

An improved method to access software components on a server network, such as enterprise beans according to the Enterprise JavaBeans architecture, by using a wrapper called an Access Bean. Access Beans hide the home and remote interface methods of an Enterprise JavaBeans server from a client program so that the task of consuming an enterprise bean is one of consuming a standard Java bean. The home interface method of the enterprise bean is mapped to appropriate constructors in the Access Bean; and the remote interface method of the enterprise bean is mapped to Java Beans methods which in turn call the corresponding business methods on the enterprise bean. More than one type of Access Bean permits caching of attributes of the enterprise bean and indexing the cache so that a plurality of instances of an enterprise bean can be efficiently supported.

35 Claims, 4 Drawing Sheets

CODE WRAPPING TO SIMPLIFY ACCESS TO AND USE OF ENTERPRISE JAVA BEANS

TECHNICAL FIELD

This invention relates generally to the field of distributed computing and more particularly relates to facilitating access to and use of reusable software components, such as Enterprise JavaBeans (EJB) components.

BACKGROUND OF THE INVENTION

Like everything else, computer use has changed over the years. In the early days, large mainframe computers dominated the industry until the advent of the personal stand-alone computer and now many businesses and homes have at least one personal stand-alone computer. A new paradigm of computing, however, is emerging: one of distributed computing in which at least two, but more likely many more computers, called clients and servers, are interconnected to through a network wherein the logic and the software applications used by one client or server resides on another server. Thus, a server provides the application software, the logic, and sometimes even the databases for a number of other servers and clients.

The explosive growth of access to the World Wide Web, moreover, has further changed the paradigm of computing such that in today's computing environment, the network connecting clients and servers is the World Wide Web. JAVA™ is a programming language developed by Sun Microsystems, Inc. that has blossomed and thrived in the mid to late 1990s coincident with the burgeoning expansion of network computer technology and browser technology on the Internet, in part because Java is independent of the operating system of a computer. Java applications can be written on one computer and transferred over a network, such as the Internet, to any processing device having a Java virtual machine regardless of the hardware or software in the receiving machine, consistent with the "Write Once, Run Anywhere" philosophy of Java software development. Thus, Java applications can be written on one server and then transferred over the Web to multiple clients/servers. In fact, this model of computing is the basis of the Enterprise JavaBeans™ technology developed by Sun Microsystems, Inc. and other software developers who write development tools.

A tutorial in definitions as used herein may be helpful. An application or a client program is a software program used by an end user. For instance, a person entering data to schedule employees' work days may be using a scheduling client program or application. A person writing a paper may be using a word processing application. A person creating a visual demonstration may be using a presentation application. A tool is a software application environment that enables a software developer to write further applications in a particular computer environment IBM Corporation's VisualAge® for Java and Microsoft Corporation's Visual J++® are examples of tools that allow a programmer to write Java applications. A component is software code that can be reused across multiple applications; in other words, a component is standard software that can be pulled off a server and incorporated into new applications using a tool by software developers. For example, a calendar component may be used in several applications such as a scheduling application, a presentation application, a database application to calculate employee's vacation and pay, etc. Thus, a software developer using tools to write an application can pull a calendar component off the server for insertion into the application.

A Java bean is a particular kind of component that can be visually manipulated in a tool and is designed according to a standard protocol of Sun Microsystems for the Java programming language, namely the JavaBeans specification. An enterprise bean is a reusable development component in a client/server environment that is designed according to Sun Microsystems' Enterprise JavaBeans specification, a programming model for server side components in Java with support for transactions and security. Enterprise beans are intended to be relatively coarse-grained business objects such as a generic purchase order or an employee record or a calendar. Preferably, Java beans and enterprise beans conform to their respective Sun specifications. However, it should be apparent to those skilled in the art that enterprise beans, Java beans or any other components defined according to a Sun specification herein need not fully conform to those specifications but rather may meet only some of the specification requirements.

An enterprise bean is defined by two interfaces: (1) the public or home interface containing methods to either create or remove enterprise beans and, in the case of persistent enterprise beans (entity beans), to find and instantiate an enterprise bean; and (2) the remote interface or EJBObject which defines the business methods of an enterprise bean that can be accessed by a client program. Any interface of a Java bean is defined by three aspects: (1) attributes; (2) events; and (3) methods. An attribute is supported by public getter and/or setter methods. Attributes of the class must be exposed to the developer by the remote interface according to the JavaBeans protocol of the specification and have a naming convention for getter/setter methods to allow the tools and programmers to easily recognize and utilize the capabilities of Java beans defined according to the JavaBeans specification. Attributes may be of three kinds: simple; boolean; or indexed, each of which may be bound or constrained. An example of a simple attribute in a spreadsheet tool would be the balance of an account. An example of an indexed attribute in the spreadsheet tool would be the owners of an account, if there were more than one owner. An example of a boolean attribute would be if the balance of the account were greater or less than a particular amount—the response would be true or false. A bound attribute tells its dependent attributes that it has changed when/after it changes. A constrained attribute notifies its dependent attributes before it changes and the listeners of that constrained attribute have the option to veto the change, which is called an exception, i.e., the dependent attribute generates an exception to the proposed change. An example of a bound attribute would be the balance of a bank account. An example of a constrained attribute would be change of ownership of the account. A session object is an Enterprise JavaBeans object that executes on behalf of a single client, can be aware of transactions, can update shared data in an underlying database but does not represent directly shared data in the database, and is relatively short-lived. An entity object provides an object view of data in the database, allows shared access of data in the database from multiple users, and can be long-lived. Java beans are distributed across a computer network through a Java Archive (JAR) which is basically a zip file with a manifest file.

FIG. 1 illustrates a typical prior art method of a client program accessing an enterprise bean. In step 1, a client program 150 must first obtain a name service context for a name server 120. Using the name server context, then in step 2, the client program 150 looks up the home interface 132 of an enterprise bean 138 (of possibly a plurality of enterprise beans n) using the name server 120. In step 3, using the home interface 132, the client program 150 creates or finds an instance of the enterprise bean 138 on the Enterprise JavaBeans (EJB) server 130. In step 4, the enterprise bean 138 returns an Enterprise JavaBeans proxy object 134, i.e., the remote interface, representing the enterprise bean instance. The proxy object 134 may issue a remote call which can generate and throw an exception if the client program 150 wishes to access or change data in database 100.

While programming directly to a Java bean is simple and well-established, programming directly to Enterprise JavaBeans interfaces increases the complexity of a user program and creates significant performance problems thus requiring extra effort on the part of the software developer. Performance is affected with enterprise beans because each call to an Enterprise JavaBeans proxy object is a remote call. If the enterprise bean has a large number of attributes, each call for an attribute is a remote call via a corresponding get XXX( ) method in the remote interface which process requires considerable processing resources and time.

There is thus a need in the industry to reduce the complexity of accessing reusable software components, especially enterprise beans according to the Enterprise JavaBeans specification, and then to eliminate the complexity of processing and time for multiple remote calls for each attribute/feature of the enterprise beans.

SUMMARY OF THE INVENTION

One aspect of the invention may be considered a method of simplifying access to a software component, comprising the steps of choosing the software component from a first server on a computer network; choosing a wrapper for the software component; mapping a home interface method of the software component to a constructor of the wrapper, and calling a remote interface method which in turns calls a software component remote interface method. The method may further comprise choosing at least one attribute of the software component to cache; and may also further comprise choosing string conversion for at least one of those chosen attributes. In a preferred embodiment the software component is an enterprise bean according to the Enterprise JavaBeans specification. When the software component is an enterprise bean and the wrapper is an Access Bean, the home interface method of the software component is mapped to a null constructor of the Access Bean. The method may occur on a second server connected to the first server on a computer network. The computer network may be the Internet.

Choosing a wrapper for the software component requires selecting one from the group consisting of a Type 1 Access Bean, a Type 2 Access Bean, and a Type 3 Access Bean. When attributes are to be cached, then choosing a wrapper for the software component further comprises selecting a Type 2 Access Bean or a Type 3 Access Bean.

The invention may also be considered a method of consuming an enterprise bean from a client program, comprising the steps of instantiating an Access Bean by calling one of a plurality of constructors; and calling a first of a plurality of methods of the Access Bean to instantiate the enterprise bean and a corresponding method of the enterprise bean. The method may further comprise calling subsequent methods of the Access Bean methods to call corresponding methods of the enterprise bean.

Yet another aspect of the invention may be considered a computer system for accessing a software component, comprising: a first server having a CPU and a software component accessed through at least one home interface method and at least one remote interface method; a second server having a CPU and client program to access the software component on the first server through a computer network; a database used by the software component and the client program; and a client program access code to map at least one home interface method of the software component to a constructor in the client program access code and to map at least one remote interface method of the software component to methods of the client program access code. The first server and the second server may be the same server in which case the computer network is an internal bus. Alternatively, the first server, the second server, the database, and the client program may each be on a different server connected on a computer network.

The invention is also a computer readable medium encoded with a set of executable instructions to perform a method for accessing a software component, the method comprising locating a name server of a software component; choosing the software component from the name server; choosing a wrapper for the software component; mapping a home interface of the software component to a null constructor of the wrapper; and mapping a remote interface method to a software component remote interface method. The computer readable medium may further comprise creating a local cache having a plurality of selected attributes of the software component; and then optionally choosing string conversion for any or all of the selected attributes. The local cache may be indexed according to each instance of the software component. The software component may be an enterprise bean.

Yet another embodiment of the invention may be a computer readable medium encoded with a set of executable instructions to perform a method for consuming an enterprise bean on a computer network, the method comprising: instantiating an Access Bean by calling one of a plurality of constructors; calling a first of a plurality of methods of the Access Bean to instantiate an enterprise bean and a corresponding method of the enterprise bean; and calling subsequent methods of the Access Bean to call corresponding methods of the enterprise bean.

The invention is also an apparatus to access a software component, comprising: a first server having the software component; a second server having a means to access the software component; means to instantiate the access means by calling a first of a plurality of constructors; means to call a first method of the access means to instantiate the software component; and means to call at least one subsequent constructor of the access means which calls a corresponding method of the software component; means to call at least one subsequent method of the access means which calls a corresponding method of the software component. The apparatus may further comprise means to cache a plurality of attributes of the software component. The software component may be an enterprise bean and the caching means may be a CopyHelper of a Type 2 or a Type 3 Access Bean wherein the Access Bean maps a plurality of setter and getter methods in a remote interface of the software component to a plurality of local get/set methods of the Access Bean. The apparatus may also have a String conversion means for at least one of the attributes. The apparatus may also have a means to index the cached attributes according to an instance of the enterprise bean where more than one instance exists. The apparatus may also have a cache synchronizing means to issue a remote call to create or flush or refresh the cache to/from said enterprise bean.

The invention is also a method of accessing an enterprise bean from a client program by wrapping the enterprise bean in an Access Bean so that the enterprise bean is seen as a Java bean to the client program. A plurality of attributes of the enterprise bean may be cached in the Access Bean. The cache may be indexed for each instance of the enterprise bean.

The invention is also a program storage device readable by a machine, tangibly embodying a program of instructions executable by a machine to perform the method steps of the invention.

In summary, in a preferred embodiment, this invention attempts to hide the complexity of programming to an enterprise bean from various Java client programs by providing a simple Java bean wrapper, called an Access Bean, for enterprise beans. The Access Bean is, generated by a development tool and hides the home and remote interfaces from the client program. The home interface methods are mapped to standard JavaBeans constructors while the remote interface methods are mapped to standard JavaBeans methods. Tedious tasks such as name context lookup and managing the enterprise bean instances are contained in runtime classes from which the generated Access Bean extends.

The use of Access Beans significantly increases performance when using large persistent enterprise beans, also called entity beans, in which all or a subset of their attributes persist in a persistent storage such as a database. The Access Bean provides fast access to an enterprise bean because the Access Bean maintains a local cache of attributes from the enterprise bean which can be indexed for more than one instance of an enterprise bean.

These and other objects, features and advantages of the present invention will be further described and more readily apparent from a review of the detailed description and preferred embodiments which follow.

DETAILED DESCRIPTION OF THE INVENTION

Figure 1:
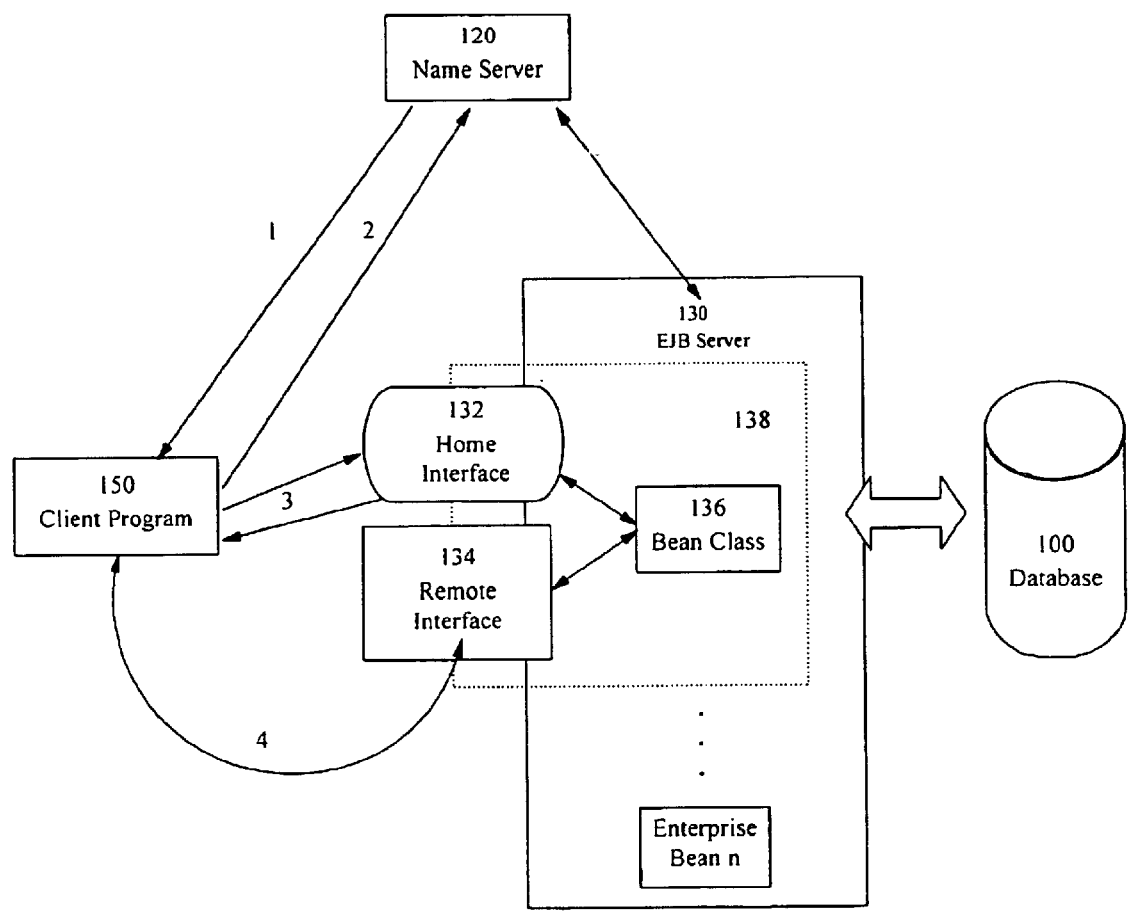
FIG. 1 is a simplified diagram of a prior art method to access an enterprise bean.
Figure 2:
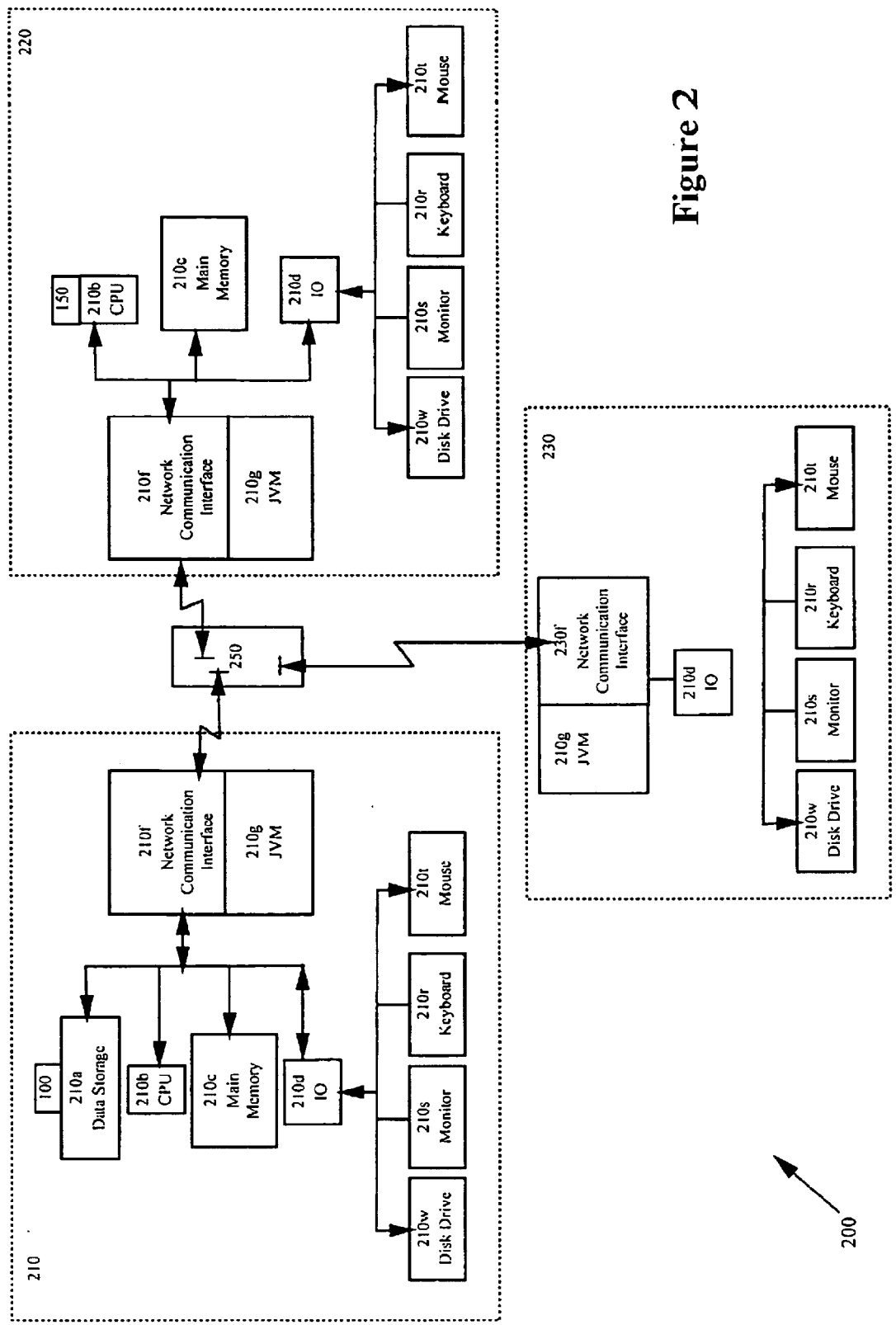
FIG. 2 is a simplified block diagram of a computer network system capable of accessing enterprise beans according to principles of the invention.

Referring now to the drawings wherein depicted elements are not necessarily shown to scale and wherein like or similar elements are designated by the same reference numeral through the several views and, more particularly to FIG. 2, there is shown a suitable computer network 200 which may be used in accordance with the principles of the invention. The computer network 200 may comprise one or more computers called servers 210, 220 or a terminal 230 which may also be called a client networked through an intercommunication system or network 250, examples of which include a local area network or the Internet or other suitable network of servers and clients. Although only two servers 210, 220 and a terminal 230 are shown to be interconnected on the network 250, more or less servers and/or terminals may be interconnected to each other. Typically, servers 210, 220 include a central processing unit (CPU) 210$b$, a main memory 210$c$, input/output (I/O) interfaces 210$d$, and a network communication interface 210$f$. The CPU 210$b$ may be programmed in any suitable manner that effects the functions described herein. Network communication interface 210$f$ connects the computer to other computers 220 or terminals 230 and preferably each has a Java virtual machine (JVM) 210$g$ connected to or integral with it. A client/server environment, as discussed before, is one in which most of the application logic resides on a computer, called a server, which serves or provides software to one or more connected servers and clients. Thus, server 210 may be considered an Enterprise JavaBeans server having a database 100 and server 220 may have a client program 150. Within the scope of the invention, however, a client program may also be located on server 210 or another server (not shown) interconnected with server 210. Terminal 230 may have only I/O devices. (210$d$, 210$w$, 210$s$, 210$r$, 210$t$) functionally connected to it as well as a network communication interface 230$f$ and, preferably, a JVM 210$g$. Through the network 250, terminal 230 relies on and is in communication with a CPU 210$b$ of another server 210, 220. A user may interact with the client program 150 and/or database 100 according to principles of the invention via a keyboard 210$r$, monitor 210$s$, and a mouse 210$t$. A removable-media disk drive 210$w$, such as a floppy disk drive or an optical disk drive is also provided, and may be used for, among other purposes, storing transmitted data and/or a client program 150. Although data storage 210$a$ is illustrated as being integral to the computer 210 for purposes of clarity and convenience, it may be remotely located and accessed via network communication interface 210$f$. Data storage 210$a$ his may contain, inter alia, a database 100 which can be accessed and/or manipulated by a client program 150 on another server 220. Consistent with the Java philosophy of "Write Once, Run Anywhere", each CPU 210$b$ may have a different processor and a different operating system. Each server 210, 220 and terminal 230 however, preferably has a Java virtual machine to run Java business methods which embody enterprise beans as components.

Figure 3:
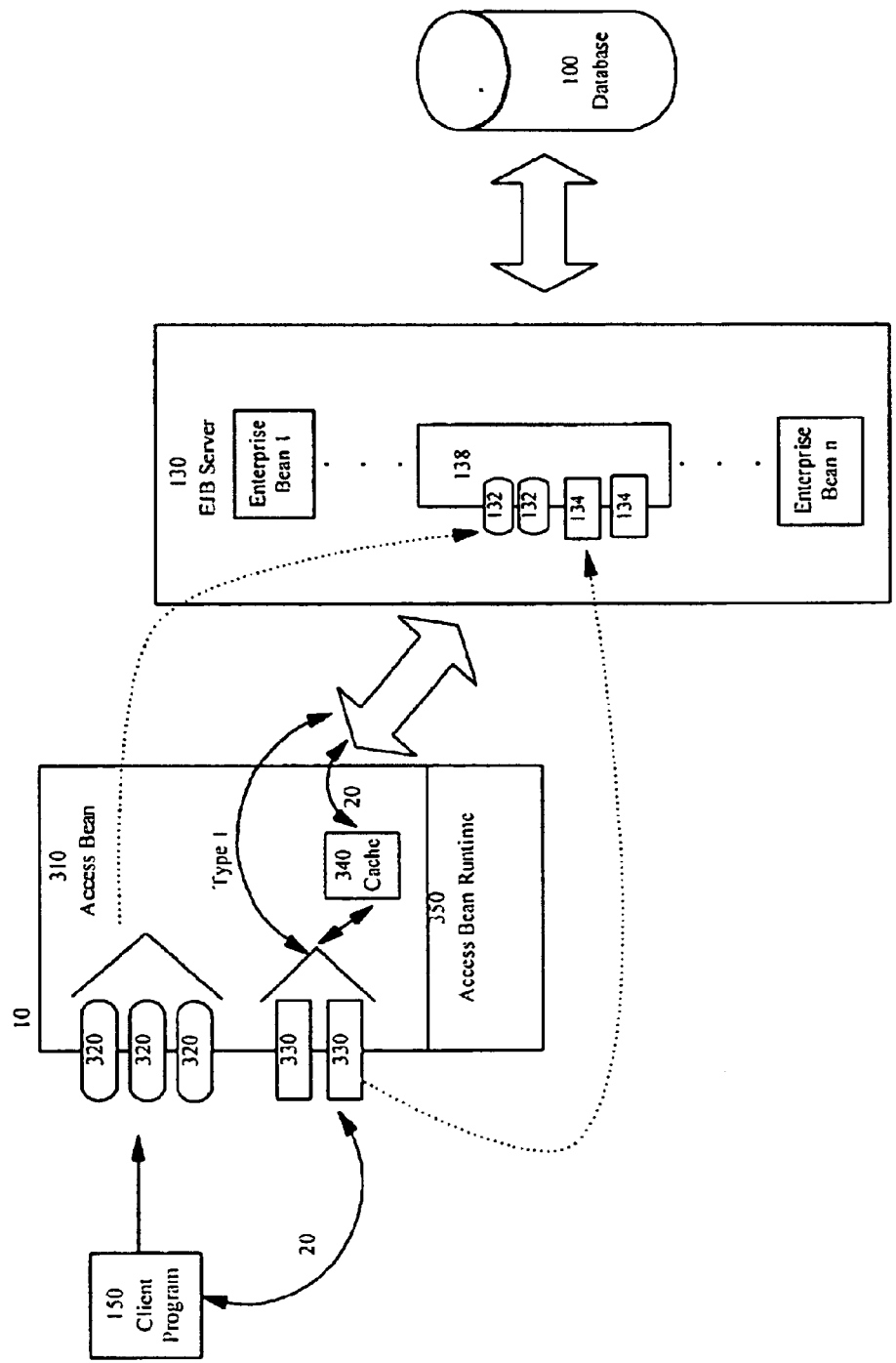
FIG. 3 is a simplified process diagram of accessing an enterprise bean using an Access Bean in accordance with principles of the invention.

FIG. 3 is a simplified conceptual diagram of how to access an Access Bean 310 and how the Access Bean 310 interacts with a client program 150 and a server-based software component, preferably in which the component is an enterprise bean 138 on an Enterprise JavaBeans server 130. Client program 150 in the context of the invention can be a Java program, such as an application, applet, or servlet or it can be another enterprise bean deployed in the same or different Enterprise JavaBeans server 130. In fact, client program 150, database 100, and Enterprise JavaBeans server 130 may all be on the same server, in which the computer network may be considered to be an internal bus or each may be on different servers. Access Bean 310 is computer executable code that wraps around a software component, such as an enterprise bean, to facilitate access to and consumption of the reusable software component by one of many client programs 150. Access Bean 310 is preferably designed to support servlets and JavaServer Pages™ (JSP) programs (a technology from Sun Microsystems that permits the creation of dynamic Web pages that are independent of hardware and server environment) but can be used by any client program that needs to access a software component, preferably an enterprise bean 138 on the server side. Access Bean 310 may also be mapped to non-Java client environments. Using Access Bean 310, consuming an enterprise bean is like consuming a Java bean because Access Bean 310 interacts with client program 150 through constructors 320 and 330 and methods as will be discussed. Access Bean 310 also has an Access Bean runtime 350 which is a set of common routines or Java classes used by the Access Bean 310 to perform its routines and tasks. Access Bean may also have a cache 340 to store attributes of an enterprise bean 138. The enterprise bean 138 is on an Enterprise JavaBeans server 130 which preferably contains a plurality of enterprise beans 1 . . . n. As with any enterprise bean, how an application program accesses the enterprise bean is defined by two interfaces: a home interface 132 and an, EJBObject interface 134, also called the remote interface. The home interface 132 contains methods that describe how a user can instantiate an enterprise bean object. The EJBObject interface 134 defines the business methods of an enterprise bean 138 that can be accessed by client program 150.

According to principles of the invention, Access Bean 310 adapts an enterprise bean 138 to the JavaBeans programming model by wrapping or hiding the enterprise bean home interface 132 and remote interface 134 from the client program 150. In step 10 of FIG. 3, Access Bean 310 is instantiated thereby instantiating an enterprise bean 138 in the EJB server 130 with appropriate constructor 320 mapping to a particular home interface method 132. In step 20, the client program 150 calls the necessary JavaBeans method 330 which in turn calls the corresponding business method on the enterprise bean 138 to access the database 100. Therefore, the task of consuming an enterprise bean 138 is reduced to one of consuming a standard Java bean. Access Beans may also provide fast access to an enterprise bean if it maintains a local cache 340 of attributes from an enterprise bean.

Access Beans may be included in any development tool which may reside in memory 210c or storage 210a of any server 210, 220, or may be contained on any computer readable medium, such as a floppy disk, an optical disk, or downloaded from computer network 250 from any other server. When a client Java Archive (JAR) file is created in a preferred development tool, all the Access Beans for the selected enterprise beans will be exported. Each Access Bean class is marked as a Java bean in the manifest file as discussed hereinafter. To create an Access Bean, the user chooses the enterprise bean for which to create an Access Bean and launches a wizard (a utility that helps a user to perform a particular task e.g. a collection of graphical user interfaces that instruct and prompt a user in the steps for completing a particular task) to generate the proper code corresponding to the Access Bean.

There are three types of Access Beans according to the present invention. The simplest type of Access Bean to create is a Type 1 Access Bean which allows an enterprise bean to be consumed like a normal Java bean. A Type 2 Access Bean, in addition to all the capabilities of a Type 1 Access Bean, has a cache called a CopyHelper object which contains a local copy of attributes from the remote enterprise bean. A client program can then retrieve enterprise bean attributes from the local CopyHelper object stored inside the Access Bean without going to the remote enterprise bean. Performance is enhanced by using the Type 2 Access Bean's local cache of a user-selected group of the enterprise bean's attributes. For these attributes marked to be cached, the Access Bean maps the setter and getter methods in the remote interface to local get/set methods which use the cache rather than calling straight through to the remote enterprise bean get/set method. Essentially, rather than issuing multiple remote calls for individual attributes, a single remote call is used to get/set multiple attributes. The user can at any time synchronize the cache with the actual enterprise bean attributes in the database by calling a single remote call to create the cache, flush the cache to the enterprise bean or refresh the cache from the enterprise bean. This significantly increases the performance of using persistent enterprise beans (entity beans) with a large number of attributes. A Type 3 Access Bean has the characteristics of Type 1 and Type 2 and contains a collection of CopyHelper objects, each corresponding to one enterprise bean instance.

Another advantage of the Access Bean is that it is serializable and therefore can be used across a computer network amongst remote Java programs as well as by other enterprise beans themselves. For example, it is common for session beans to use and control multiple entity beans in a distributed server application. The session bean in this case can make use of the Access Bean to use those entity beans rather than programming to them directly. A related advantage is that because attribute management is now conducted by the Access Bean, any remote exceptions thrown by the Enterprise JavaBeans server in getting/setting an attribute are not exposed to the client program which is not expected to know about the Enterprise JavaBeans programming model. The order of complexity to create an Access Bean increases from Type 1 to Type 3 but it makes little difference to the Access Bean users because the complexity that exists on the creation of Access Beans is managed according to principles of the invention.

A Type 1 Access Bean is the simplest Access Bean in which all methods of an Access Bean call the corresponding home or remote interface method directly and hides the interfaces from the client program. To look up a home interface, an Access Bean preferably obtains a name service context, also referred as the rootContext. A rootContext can be constructed given the it name server uniform resource locator (URL) and the name service type. The Access Bean provides two APIs setInit_NameServiceTypeName( ) and setInit_NameServiceURLName( ) to allow the users to define a customized rootContext. Development tools may provide a runtime API to create the default rootContext. A default Java Naming and Directory Interface (JNDI) name is generated into each Access Bean class. The code generator reads the deployment descriptor and saves the JNDI name into the Access Bean. The JNDI can be changed using the setInit_JNDIName ( ) method; normally, however, the JNDI name is not expected to change. An enterprise bean, moreover, can be deployed into different homes. In this case, the administrator may add a prefix to the JDNI name to specify the different home location of the enterprise bean.

An Access Bean may contain one or more init_xx properties, each of which correspond to a parameter in the create or find method defined in the home interface method. A developer of the Access Bean can choose a home interface method of the enterprise bean to represent the null or no-arg constructor of the Access Bean. The Access Bean may contain multiple argument constructors, each one of which corresponds to a create or find method defined in the enterprise bean home interface methods. To simplify a JavaServer Pages program that normally handles a String type, the Access Bean exposes the init_xx properties which are preferably set before any other calls to the Access Bean if the null (no-arg) constructor is used. When the null constructor is used, the Access Bean performs lazy initialization. A key field is normally declared as simple type to make it easier to consume an Access Bean by the visual type tools. When the Access Bean is instantiated, it does not instantiate the enterprise bean; rather the remote enterprise bean is instantiated on a remote method call if the enterprise bean has not been instantiated. When multiple Access Bean instances using the same home interfaces, e.g., same JDNI name and rootContext, are instantiated, the Access Bean class only looks at the corresponding enterprise bean home once. Each Access Bean class keeps track of class levels to improve performance on instantiating an enterprise bean.

An enterprise bean method can return an enterprise bean object or an enumeration of enterprise bean objects. When such a method is generated in the Access Bean class, the return type is changed to the corresponding Access Bean type. This allows a client program to deal with the Access Bean type only and takes the benefits provided by the Access Bean.

An enterprise bean object such as an entity bean may have many attributes. The attributes are normally used to create an HTML page by a JavaServer Pages program. A servlet invokes a command such as a request to an enterprise bean and then invokes a JavaServer Pages program to display the result; it typically invokes a different JavaServer Pages program depending on whether the command is successful. Thus, in this situation, it is preferable that a call to retrieve an attribute should be fast because there could be many attributes that a JavaServer Pages program needs to retrieve. A call to retrieve an attribute, moreover, should not cause an exception as it will unnecessarily complicate the Java ServerPages logic. A Type 1 Access Bean does not meet these requirements because every call is a remote call that can throw a remote exception and has a long execution call path. To solve this problem, the CopyHelper cache was introduced in a Type 2 Access Bean.

A Type 2 Access Bean has all the features of Type 1 but adds a feature wherein a group of attributes selected by the user are cached locally in a CopyHelper object and written from/read to the enterprise bean as a group. The CopyHelper object is implemented as a cache of attribute values indexed by their name. All get/set methods are delegated to the CopyHelper object rather than directly calling the remote get/set method. The user chooses which attributes of the enterprise bean will be cached and is given the option of choosing a String converter for that attribute.

When building a Type 2 Access Bean in a preferred development tool, a "Create Access Bean" wizard displays all the attributes defined in the Bean Class based on the get/set methods and a user can select all or a subset of these attributes to create a CopyHelper object. The selected attributes are saved into the enterprise bean meta model and are redisplayed when the user desires to change the selection. The CopyHelper object is stored inside the Access Bean so it behaves as a seamless cache to the client program. Get and set methods are delegated to the local CopyHelper object instead of the remote enterprise bean object. When a Type 2 Access 1 Bean is created, a CopyHelper interface is added to the corresponding EJBObject interface. There are two methods defined in the CopyHelper interface, _copyToEJB( ) and _copyFromEJB( ), which are automatically generated into the Bean Class by the Access Bean code generation in order to avoid a remote exception that may occur in a call to the first getter method. To commit the changes in the CopyHelper to the remote enterprise bean or refresh the local CopyHelper from the remote enterprise bean, a user program must call commitCopyHelper and refreshCopyHelper, respectively.

For the CopyHelper object, users may specify a String converter. A JavaServer Pages program normally expects a String type to construct HTML page. An implementation of the invention preferably provides a simple String converter for primitive Java types. In a preferred development tool, a user can create a String converter and specify it in the wizard for generating the Access Bean. Users may also make selected attributes in the CopyHelper object to be bound properties.

A Type 3 Access Bean contains a collection of CopyHelper objects. A Type 3 Access Bean is a superset of the Type 1 and 2 Access Beans and provides an Access Bean table class which allows the user to view and manage a collection of entity bean instances as a table with each row corresponding to the attributes of a particular enterprise bean instance. A CopyHelper object contains the primary key for each entity bean instance but not the proxy object itself for the entity bean. When a session bean returns a Type 3 Access Bean as a result set, only the attributes of the entity beans are copied to the client space. The large number of enterprise bean proxy objects are not copied because copying them from the server space to the client space can cause performance problems, thus using a table in the Type 3 Access Bean is especially useful for home interface finder methods which return a collection of entity bean instances. From an Access Bean point of view, this translates to the corresponding Access Bean method returning a collection of Access Bean types, one for each entity bean instance. Also this Access Bean method will be made static because it is more intuitive.

A JavaServer Pages program often needs to build a table from a collection of entity bean instances but at this time is incapable of handling an enumeration type. Instead of an enumeration type, a Java ServerPages program can read from a Type 3 Access Bean immediately without causing any remote call because a Type 3 Access Bean exposes each row as an indexed property. On an update call, e.g., commitCopyHelper, the Access Bean constructs the enterprise bean proxy object using the key object saved in the CopyHelper. All Access Beans are serializable. A session bean will use this as a return type. For example, a session bean performing a search function will return the result set as a Type 3 Access Bean object.

Figure 4:
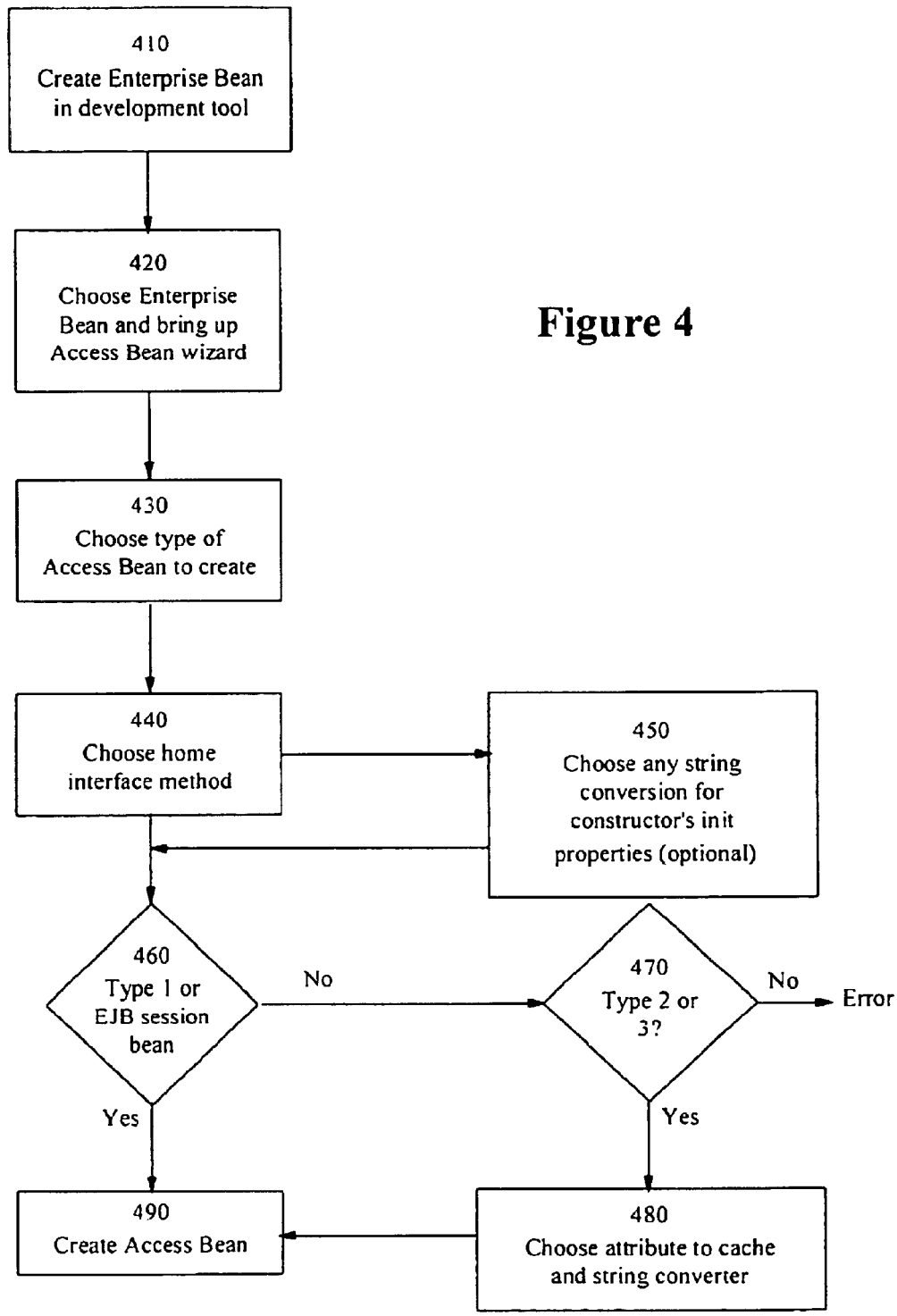
FIG. 4 is a simplified flow chart of the creation of an Access Bean in accordance with principles of the invention.

FIG. 4 is a simplified flow chart of the method by which to create an Access Bean. In step 410, an enterprise bean has previously been created and is stored in an EJB server, such as EJB server 130 in FIG. 3. In step 420, a software developer chooses a particular enterprise bean and brings up a wizard in a preferred development tool, to guide the developer through the process of creating an Access Bean for the selected enterprise bean. In step 430, the developer chooses the type of Access Bean to create. If the enterprise bean need only be instantiated once, then it is appropriate to choose a Type 1 Access Bean as discussed above. If there are to be multiple instances of the enterprise bean, then the user will decide to use a Type 2 Access Bean which caches in the interfaces used or to use a Type 3 Access Bean which not only caches the interfaces but also indexes the instances of the bean.

In step 440 of FIG. 4, the software developer chooses an appropriate home interface method. The JavaBeans specification requires that a Java bean contain a constructor with no arguments—a null constructor. To circumvent any potential problems for an Access Bean if all the methods in the home interface of an enterprise bean have arguments, the user is asked by the wizard which home interface method to designate as the Access Bean's null constructor. The ire chosen methods parameter types are then stored as instance variables in the Access Bean which will have setter methods with the special naming scheme of setInit_XXX where XXX is the parameter names. The Access Bean developer preferably calls these setter methods immediately after instantiating the Access Bean and before calling any other methods in the Access Bean. Also, the developer preferably uses string conversion on these setter methods to make the Access Bean compatible with various visual bean constructor tools. Whenever the no-arg constructor is used, the Access Bean does not instantiate the actual enterprise bean when the Access Bean is instantiated. On the first business method, remote interface method, call, the Access Bean will instantiate the enterprise bean if it has not already been instantiated.

In step 450, the developer is given the option of working with String versions of all parameters and return values. Whenever a method parameter or return type is not a String, the developer has the choice of using String conversion for that type using either a provided simple String converter for Java primitive types or one that the user provides. This allows the Access Bean to be used amongst various end-user client programs such as JavaServer Pages programs where dealing with Strings is ideal. Also certain visual bean constructor tools only allows Strings to be used in bean methods. If the Access Bean is of Type 1 or a session bean, as in step 460, the Access Bean is created in step 490. If a Type 2 or a Type 3 Access Bean is to be created as in step 470, the software developer chooses any String converters and which attributes to cache in the CopyHolder, as in step 480. Then the Access Bean is created in step 490.

Following are specific examples of how to create and use an Access Bean implemented for an entity bean "Employee":

Each constructor of the Access Bean maps to one of these home interfaces:

```
public interface EmployeeHome extends EJBHome {
    public Employee findByPrimaryKey{ EmployeeKey key )
        throws java.rml.RemoteException, javax.ejb.FinderException;
    public Employee create( String name, int years, float salary )
        throws javax.ejb.CreateException, java.rml.RemoteException;
    public java.util.Enumeration findEmploveesMoreYearsThan( int years )
        throws java.rml.RemoteException, javax.ejb.FinderException;
}
```

The remote interface is:

```
public interface Employee extends EJBObject {
    public String getName( ) throws java.rml.RemoteException;
    public void setName( String name ) throws java.rml.RemoteException;
    public int getYears( ) throws java.rml.RemoteException;
    public void setYears( int years } throws java.rml.RemoteException;
    public float getSalary( ) throws java.rml.RemoteException;
    public float setSalary( float salary ) throws java.rml.RemoteException;
}
```

Assume that the user has chosen a Type 2 Access Bean to be generated and the fields chosen for caching are "years" and "salary" with String conversion for salary. The second home interface method has been chosen as the null constructor method. The generated Access Bean is as follows:

```
public class EmployeeAccessBean {
    private String init_name
    private int init_years
    private float init_salary;
```

```
// null constructor
public EmployeeAccessBean( ) {
    super( );
}
public EmployeeAccessBean( EmployeeKey key )
        throws java.rml.RemoteException,
        javax.ejb.FinderException,
        javax.naming.NamingException {
    // ejbRef holds the reference to the EJB instance, and
    // its type is the remote interface class.
    // ejbHome( ) locates the home instance.
    // These methods reside in the abstract bean super classes.
    ejbRef = ejbHome( ).findByPrimaryKey(arg0);
}
// this returns a collection of EmployeeAccessBean classes
public static
java.util.Enumeration findEmployeesMoreYearsThan( int years )
        throws java.rml.RemoteException,
        javax.ejb.FinderException,
        javax.naming.NamingException {
    EmployeeHome localHome = ejbHome( );
    java.util.Enumeration ejbs =
    localHome.findEmployeesMoreYearsThan(years);
    return createAccessBeans(ejbs);
}
```

The following are setter methods used to initialize the home interface method parameters with the null constructor chosen.

```
public void setInit_name( String name ) {
    this.init_name = name;
}
public void setInit_years( String years ) {
    this.init_years = SimpleStringConverter.StringToint(years};
}
public void setInit_salary( String salary ) {
    this.init_salary = SimpleStringConverter.StringTofloat(salary);
}
private EmployeeHome ejbHome( ) {
    return (EmployeeHome} getHome( );
}
private ejbRef( ) {
    return (Employee} ejbRef;
}
```

The following method is used by all other methods to lazy instantiate the enterprise bean using the chosen home interface method as the null constructor.

```
public void instantiateEJB( ) throws java.rml.RemoteException,
        javax.ejb.Create Exception,
        javax.naming.NamingException {
    if ( ejbRef( ) != null )
    return;
    ejbRef = ejbHome( ).create(init_name, init_years, init_salary);
}
```

The remote interface methods are:

```
public String getName( ) {
    instantiate EJB( );
    return ejbRef( ).getName( );
}
public void setName( String name ) {
    instantiateEJB( );
    ejbRef( ).setName(name);
}
```

```
        -continued public int getYears( ) {
        // Use runtime method to get the attribute value from
        // the copy helper object (cache).
        return__getCache("name");
    }
    public void setYears( int years ) {
        __setCache("name", new Integer(years));
    }
    public String getSalary ( ) {
        return SimpleStringConverter.floatToString(
            (float) __getCache("salary"));
    }
    public void setSalary( String salary ) {
        __setCache("salary", new Float(
            SimpleStringConverter.StringTofloat(salary))):
    }
}
```

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise one or more general purpose computers as selectively activated or reconfigured by a computer program stored in the computer(s). The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

Each step of the method may be executed on any general computer, such as a mainframe in computer, personal computer or the like and pursuant to one or more, or a part of one or more, program modules or objects generated from any programming language, such as C++, Sun Microsystems' Java™, Fortran or the like. And still further, each step, or a file or object or the like implementing each step, may be executed by special purpose hardware or a circuit module designed for that purpose.

In the case of flow diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the description herein may refer to interactions with a user interface by way of, for example, computer mouse operation, it will be understood that within the present invention the user is provided with the ability to interact with these graphical representations by any known computer interface mechanisms, including without limitation pointing devices such as computer mouses or trackballs, joysticks, touch screen or light pen implementations or by voice recognition interaction with the computer system.

While the preferred embodiment of this invention has been described in relation to the Java language, this invention need not be solely implemented using the Java language. It will be apparent to those skilled in the art that the invention may equally be implemented in other computer languages, such as object oriented languages like C++ and Smalltalk.

The invention is preferably implemented in a high level procedural or object-oriented programming language to communicate with a computer. However, the invention can be implemented in assembly or machine language; if desired. In any case, the language may be a compiled or interpreted language.

While aspects of the invention relate to certain computer language and other technological specifications (e.g. the Java Language Specification with respect to the Java computer language), it should be apparent that classes, objects, components and other such software and technological items referenced herein need not fully conform to the specification(s) defined therefor but rather may meet only some of the specification requirements. Moreover, the classes, objects, components and other such software and technological items referenced herein may be defined according to equivalent specification(s) other than as indicated herein that provides equivalent or similar functionality, constraints, etc. For example, instead of the Java language specification, classes, objects, components and other such software and technological items referenced herein may be defined according to Microsoft Corporation's Active™ specification where applicable and appropriate.

The invention may be implemented as an article of manufacture comprising a computer usable medium having computer readable program code means therein for executing the method steps of the invention, a program storage device readable by a machine, tangibly embodying a program of instructions executable by a machine to perform the method steps of the invention, an article of manufacture comprising a computer usable medium having computer readable program code means therein, the computer readable program code means in said computer program product comprising computer readable code means for causing a computer to execute the steps of the invention or a computer readable medium encoded with a set of executable instructions to perform the method steps of the invention. Such an article of manufacture, program storage device or computer readable medium may include, but is not limited to, CD-ROMs, diskettes, tapes, hard drives, and computer RAM or ROM. Indeed, the article of manufacture, program storage device or computer readable medium may be any solid or fluid transmission medium, magnetic or optical, or the like, for storing or transmitting signals readable by a machine for controlling the operation of a general of special purpose programmable computer according to the method of the invention and/or to structure its components in accordance with a system of the id invention.

The invention also may be implemented in a computer system. A computer system may comprise a computer that includes a processor and a memory device and optionally, a storage device, an output device such as a video display and/or an input device such as a keyboard or computer mouse. Moreover, a computer system may comprise an interconnected network of computers. Computers may equally be in stand-alone form (such as the traditional desktop personal computer) or integrated into another apparatus (such a cellular telephone).

While this invention has been described in relation to preferred embodiments, it will be understood by those skilled in the art that changes in the details of construction, arrangement of parts, compositions, processes, structures and materials selection may be made without departing from the spirit and scope of this invention. Many modifications and variations are possible in light of the above teaching. Thus, it should be understood that the above described embodiments have been provided by way of example rather than as a limitation and that the specification and drawing(s) are, accordingly, to be regarded in an illustrative rather than a restrictive sense.

What is claimed is:

1. A method of simplifying access to a software component, comprising the steps of:
    choosing said software component by a user from a first server on a computer network;
    choosing a wrapper for said software component by said user based upon single or multiple usage of said software component;
    mapping a home interface of said software component to a constructor of said wrapper such that the home interface and a remote interface of said software component are hidden from a client program; and
    calling a remote interface method of said software component by the client program which in turns calls the remote interface of the software component.

2. The method of claim 1, further comprising the step of choosing at least one attribute of said software component to cache.

3. The method of claim 2, further comprising the step of choosing string conversion for said at least one chosen attribute.

4. The method of claim 3 wherein said software component is an enterprise bean.

5. The method of claim 1 wherein said software component is an enterprise bean.

6. The method of claim 5, wherein said step of mapping a home interface method of said enterprise bean further comprises mapping to a null constructor of said wrapper.

7. The method of claim 6 wherein said method occurs on a second server connected to said first server on a computer network.

8. A method of claim 5 for accessing an enterprise bean from a client program, comprising wrapping said enterprise bean in an Access Bean so that said enterprise bean is seen as a Java bean to said client program.

9. The method of claim 8, further comprising caching a plurality of attributes of said enterprise bean in said Access Bean.

10. The method of claim 9, further comprising indexing said plurality of attributes of said enterprise bean in a table having an entry for each instance of said enterprise bean.

11. The method of claim 1 wherein said method occurs on a second server connected to said first server on a computer network.

12. The method of claim 11 wherein said computer network is the Internet.

13. The method of claim 1 wherein said computer network is the Internet.

14. The method of claim 13 wherein said step of choosing a wrapper for said software component further comprises selecting one from the group consisting of a Type 1 Access Bean, a Type 2 Access Bean, and a Type 3 Access Bean.

15. The method of claim 1 wherein said step of choosing a wrapper for said software component further comprises selecting one from the group consisting of a Type 1 Access Bean, a Type 2 Access Bean, and a Type 3 Access Bean.

16. The method of claim 15, wherein said step of choosing a wrapper for said software component further comprises selecting a Type 2 Access Bean or a Type 3 Access Bean.

17. A method of consuming an enterprise bean from a client program, comprising the steps of:
    instantiating an Access Bean having a home interface and remote interface of said enterprise bean by calling one of a plurality of constructors; and
    calling a first of a plurality of methods of said Access Bean to instantiate said enterprise bean and a corresponding method of said enterprise bean; and
    calling subsequent methods of said plurality of methods of said Access Bean to call corresponding methods of said enterprise bean.

18. A computer system for accessing a software component, comprising:
    a first server having a CPU and a software component accessed through at least one home interface and at least one remote interface;
    a second server having a CPU and client program to access said software component on said first server through a computer network;
    a database used by said software component and said client program; and
    a client program access code to map said at least one home interface method of said software component to a constructor in said client program access code and to map said at least one remote interface method of said software component to methods of said client program access code in an access bean.

19. The computer system of claim 18, wherein said first server, said second server are the same server and said computer network is an internal bus.

20. The computer system of claim 18, wherein said first server, said second server, said database, and said client program are all on different servers connected with each other on said computer network.

21. A computer readable medium encoded with a set of executable instructions to perform a method for accessing a software component, the method comprising:
    locating a name server of said software component;
    choosing said software component from said name server;
    choosing a wrapper for said software component based upon single or multiple usage of said software component;

mapping a home interface of said software component to a null constructor of said wrapper within an access bean; and mapping a remote interface method to a software component remote interface within the access bean.

22. The computer readable medium of claim 21, further comprising creating a local cache having a plurality of selected attributes of said software component.

23. The computer readable medium of claim 22, further comprising choosing string conversion for at least one of said plurality of selected attributes.

24. The computer readable medium of claim 22, further comprising indexing said local cache for each instance of said software component.

25. The computer readable medium of claim 24 wherein said software component is an enterprise bean.

26. The computer readable medium of claim 22 wherein said software component is an enterprise bean.

27. A computer readable medium encoded with a set of executable instructions to perform a method for consuming an enterprise bean on a computer network, the method comprising:

instantiating an Access Bean having the home interface and remote interface of said enterprise bean by calling one of a plurality of constructors; and calling a first of a plurality of methods of said Access Bean to instantiate an enterprise bean and a corresponding method of said enterprise bean; and calling subsequent methods of said plurality of methods of said Access Bean to call corresponding methods of said enterprise bean.

28. An apparatus to access a software component, comprising:

a first server having said software component;

a second server having a means to access said software component;

means to instantiate said access means by calling one of a plurality of constructors in an access bean having both a home interface and remote interface for said software component;

means to call a first method of said access means to instantiate said software component; and means to call at least one subsequent constructor of said access means which calls a corresponding method of said software component; and means to call at least one subsequent method of said access means which calls a corresponding method of said software component.

29. The apparatus of claim 28, further comprising means to cache a plurality of attributes of said software component.

30. The apparatus of claim 29, wherein said software component is an enterprise bean and said caching means is a CopyHelper of a Type 2 or a Type 3 Access Bean and said Access Bean maps a plurality of setter and getter methods in a remote interface of said software component to a plurality of local get/set methods of said Access Bean.

31. The apparatus of claim 30, further comprising a String conversion means for at least one of said plurality of said attributes.

32. The apparatus of claim 31 further comprising means to itemize said plurality of cached attributes corresponding to more than one instance of said enterprise bean.

33. The apparatus of claim 30 further comprising means to itemize said plurality of cached attributes corresponding to more than one instance of said enterprise bean.

34. The apparatus of claim 33 further comprising a cache synchronizing means to issue a remote call to create or flush or refresh said cache to/from said enterprise bean.

35. The apparatus of claim 29 further comprising a cache synchronizing means to issue a remote call to create or flush or refresh said cache to/from said enterprise bean.

* * * * *